(12) United States Patent
Awata

(10) Patent No.: US 8,427,661 B2
(45) Date of Patent: Apr. 23, 2013

(54) APPARATUS AND METHOD FOR EFFICIENTLY CONTROLLING PRINTERS ASSOCIATED WITH DIFFERENT NETWORKS BASED UPON ACQUIRED PRINTER OR NETWORK INFORMATION, AND NONTRANSITORY COMPUTER READABLE RECORDING MEDIUM FOR CAUSING COMPUTER TO FUNCTION AS THE SAME

(75) Inventor: Satoshi Awata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 150 days.

(21) Appl. No.: 12/931,456

(22) Filed: Feb. 1, 2011

(65) Prior Publication Data
US 2011/0188064 A1  Aug. 4, 2011

(30) Foreign Application Priority Data
Feb. 2, 2010 (JP) ................................. 2010-021438

(51) Int. Cl.
G06F 3/12 (2006.01)
(52) U.S. Cl.
USPC ........................................ 358/1.13; 358/1.15
(58) Field of Classification Search ................. 358/1.15, 358/1.13
See application file for complete search history.

(56) References Cited

U.S. PATENT DOCUMENTS

| 7,978,351 B2 * | 7/2011 | Ishida et al. ................. 358/1.13 |
| 2002/0030852 A1 | 3/2002 | Matsuo |
| 2003/0093531 A1 * | 5/2003 | Yeung et al. .................. 709/226 |
| 2009/0013065 A1 * | 1/2009 | Nagashima ................... 709/223 |
| 2011/0075176 A1 * | 3/2011 | Nishio .......................... 358/1.13 |

FOREIGN PATENT DOCUMENTS

| JP | 2002-091732 A | 3/2002 |
| JP | 2005-044024 A | 2/2005 |
| JP | 2006-185251 A | 7/2006 |
| JP | 2007-072609 A | 3/2007 |

* cited by examiner

Primary Examiner — King Poon
Assistant Examiner — Andrew H Lam
(74) Attorney, Agent, or Firm — Edwards Wildman Palmer LLP; David G. Conlin; David A. Tucker

(57) ABSTRACT

A printer control apparatus including a printer search section that searches for, acquires and stores information indicative of printers connected to the network, in a printer information storage section; a network information acquiring section that acquires network information of first and second networks connected to the printer control apparatus at different times and that stores the acquired network information in a network information storage section; and a printer information acquiring section that acquires printer information from the printer search section in a case where the network information of the second network is different from the network information of the first network by causing the printer search section to conduct a search, and acquires the printer information from the printer information storage section in a case where the network information of the second network is identical to the network information of the first network.

11 Claims, 10 Drawing Sheets

FIG. 10 (a)

|  | IP ADDRESS | MANUFACTURER | AVAILABILITY OF COLOR PRINTING |
|---|---|---|---|
| PRINTER(1) 21 | 123.123.123.2 | SHARP | AVAILABLE |
| PRINTER(2) 22 | 123.123.123.3 | SHARP | UNAVAILABLE |
| PRINTER(3) 23 | 123.123.123.4 | XXX CORPORATION | UNAVAILABLE |
| PRINTER(4) 31 | 456.456.456.2 | SHARP | AVAILABLE |
| PRINTER(5) 32 | 456.456.456.3 | YYY CORPORATION | UNAVAILABLE |

FIG. 10 (b)

| PC 10 | IP ADDRESS |
|---|---|
| DURING USE OF PRINTING SYSTEM (1) 1 | 123.123.123.100 |
| DURING USE OF PRINTING SYSTEM (2) 2 | 456.456.456.200 | ns apparatus and method for efficiently controlling printers associated with different networks based upon acquired printer or network information, and nontransitory computer readable recording medium for causing computer to function as the same This Nonprovisional application claims priority under 35 U.S.C. §119(a) on Patent Application No. 2010-021438 filed in Japan on Feb. 2, 2010, the entire contents of which are hereby incorporated by reference.

TECHNICAL FIELD

The present invention relates to a printer control apparatus, a printer control method, a printing system, and a storage medium, each of which utilizes a printer driver.

BACKGROUND ART

In a case where data created in an information processing apparatus such as a personal computer is printed, the information processing apparatus sends the data to a printer such as an image forming apparatus and requests the printer to print the data. In this case, the information processing apparatus converts the data into a data format that can be received by the printer before sending the data. For this purpose, a printer driver for converting the data as above needs to be installed in the information processing apparatus.

It is necessary that a printer driver that supports the model of the printer be installed in the information processing apparatus. On this account, conventionally, in a case where an information processing apparatus requests printers of different models to print data, printer drivers that support the respective printers must be installed in the information processing apparatus.

In recent years, a so-called universal printer driver that can support a plurality of printers has been increasingly used as a printer driver. For example, the universal printer driver disclosed in Patent Literature 1 is known.

Specifically, according to the universal printer driver disclosed in Patent Literature 1, when a user sets printing preferences, a search is conducted so that printers connected to a network to which a personal computer having the universal printer driver is connected are extracted. Thus, the user can select any one of the printers thus extracted.

CITATION LIST

Patent Literature 1

Japanese Patent Application Publication, Tokukai, No. 2002-091732 A (Publication Date: Mar. 29, 2002)

SUMMARY OF INVENTION

Technical Problem

However, according to the arrangement disclosed in Patent Literature 1, a search for extracting printers is conducted every time a user sets printing preferences. This undesirably prolongs a time required for setting of the printing preferences, thereby preventing speedy printing.

In view of the above problem, an object of the present invention is to provide a printer control apparatus, a printer control method, a printing system, and a storage medium, each of which can shorten a time required for setting of printing preferences so that printing can be speedily started.

Solution to Problem

In order to attain the above object, a printer control apparatus of the present invention which controls plural kinds of printers by use of a universal printer driver which is capable of communicating with the plural kinds of printers via a network and which supports the plural kinds of printers, includes: printer information storage means; a printer search section that conducts a search for printers connected to the network, acquires printer information indicative of the printers thus extracted by the search, and causes the printer information thus acquired to be stored in the printer information storage means; network information storage means; a network information acquiring section that acquires network information for determining whether or not a second network connected to the printer control apparatus this time is identical to a first network connected to the printer control apparatus previous time and that causes the network information thus acquired to be stored in the network information storage means; and a printer information acquiring section that compares network information of the second network and network information of the first network, and in a case where the network information of the second network is different from the network information of the first network, the printer information acquiring section acquiring the printer information from the printer search section by causing the printer search section to conduct the search, whereas in a case where the network information of the second network is identical to the network information of the first network, the printer information acquiring section acquiring the printer information from the printer information storage means without causing the printer search section to conduct the search.

Further, a printer control method of the present invention for controlling plural kinds of printers by use of a universal printer driver which is capable of communicating with the plural kinds of printers via a network and which supports the plural kinds of printers, includes the steps of: (a) conducting a search for printers connected to the network, acquiring printer information indicative of the printers thus extracted by the search, and causing the printer information thus acquired to be stored in printer information storage means; (b) acquiring network information for determining whether or not a second network used this time is identical to a first network used previous time and that causes the network information thus acquired to be stored in network information storage means; and (c) comparing network information of the second network and network information of the first network, and in a case where the network information of the second network is different from the network information of the first network, acquiring the printer information by carrying out the step (a), whereas in a case where the network information of the second network is identical to the network information of the first network, acquiring the printer information stored in the printer information storage means without carrying out the step (a).

According to the arrangement, the printer search section (the step (a)) conducts a search for printers connected to a network, acquires printer information of the printers thus extracted by the search, and causes the printer information to be stored in the printer information storage means.

The network information acquiring section (the step (b)) acquires network information for determining whether or not a second network connected to the printer control apparatus this time is identical to a first network connected to the printer control apparatus previous time, and causes the network information thus acquired to be stored in the network information storage means.

The printer information acquiring section (the step (c)) compares network information of the second network and network information of the first network, and in a case where the network information of the second network is different from the network information of the first network, the printer information acquiring section (the step (c)) acquiring the printer information by causing the printer search section (the step (a)) to conduct the search, whereas in a case where the network information of the second network is identical to the network information of the first network, the printer information acquiring section (the step (c)) acquiring the printer information from the printer information storage means without causing the printer search section (the step (a)) to conduct the search.

As described above, according to the arrangement of the present invention, in a case where the second network connected to the printer control apparatus this time is identical to the first network connected to the printer control apparatus previous time, the search for the printers connected to the network is not conducted, and the printer information stored in the printer information storage means is utilized. This can shorten a time required for setting of printing preferences, thereby allowing speedy printing.

In order to attain the above object, a printer control apparatus of the present invention which controls plural kinds of printers by use of a universal printer driver which is capable of communicating with the plural kinds of printers via a network and which supports the plural kinds of printers, includes: network information storage means; a network information acquiring section that acquires network information for determining whether or not a second network connected to the printer control apparatus this time is identical to a first network connected to the printer control apparatus previous time and that causes the network information thus acquired to be stored in the network information storage means; printer information storage means; a printer search section that conducts a search for printers connected to the network, acquires printer information indicative of the printers thus extracted by the search, and causes the printer information thus acquired to be associated with the network information and to be stored, as history information, in the printer information storage means; and a printer information acquiring section that compares network information of the second network and network information of the first network, and in a case where the network information of the second network is different from the network information of the first network and where the history information stored in the printer information storage means does not include the printer information of the second network, the printer information acquiring section acquiring the printer information from the printer search section by causing the printer search section to conduct the search, whereas in a case where the network information of the second network is different from the network information of the first network and where the history information stored in the printer information storage means includes the printer information of the second network or in a case where the network information of the second network is identical to the network information of the first network, the printer information acquiring section acquiring the printer information corresponding to the network information of the second network from the printer information storage means without causing the printer search section to conduct the search.

According to the arrangement, the network information acquiring section acquires network information for determining whether or not a second network connected to the printer control apparatus this time is identical to a first network connected to the printer control apparatus previous time, and causes the network information thus acquired to be stored in the network information storage means.

The printer search section conducts a search for printers connected to a network, acquires printer information indicative of the printers thus extracted by the search, and causes the printer information thus acquired to be associated with the network information and to be stored, as history information, in the printer information storage means.

The printer information acquiring section compares network information of the second network and network information of the first network. In a case where the network information of the second network is different from the network information of the first network and where the history information stored in the printer information storage means does not include the printer information of the second network, the printer information acquiring section acquires the printer information from the printer search section by causing the printer search section to conduct the search. Meanwhile, in a case where the network information of the second network is different from the network information of the first network and where the history information stored in the printer information storage means includes the printer information of the second network or in a case where the network information of the second network is identical to the network information of the first network, the printer information acquiring section acquires the printer information corresponding to the network information of the second network from the printer information storage means without causing the printer search section to conduct the search.

As described above, according to the arrangement of the present invention, not only in a case where the second network connected to the printer control apparatus this time is identical to the first network connected to the printer control apparatus previous time, but also in a case where the second network connected to the printer control apparatus this time is different from the first network connected to the printer control apparatus previous time, the search for the printers connected to the network is not conducted, and the printer information stored in the printer information storage means is utilized, as long as the printer information corresponding to the network information of the current network is stored, as history information, in the printer information storage means. This can shorten a time required for setting of printing preferences, thereby allowing speedy printing.

Advantageous Effects of Invention

According to the arrangement of the present invention, in a case where a second network connected to the printer control apparatus this time is identical to a first network connected to the printer control apparatus previous time, a search for printers connected to the network is not conducted, and printer information stored in the printer information storage means is utilized. This can shorten a time required for setting of printing preferences, thereby allowing speedy printing.

BRIEF DESCRIPTION OF DRAWINGS

FIG. 10 (*a*) is an explanatory view showing IP addresses, manufacturers, and availability of color printing of the first through third printers of the first printing system shown in FIG. 1 and first and second printers of the second printing system shown in FIG. 2, and FIG. 10 (*b*) is an explanatory view showing an IP address of the PC in the first printing system shown in FIG. 1 and an IP address of the PC in the second printing system shown in FIG. 2.

DESCRIPTION OF EMBODIMENTS

Embodiment 1

Figure 1:
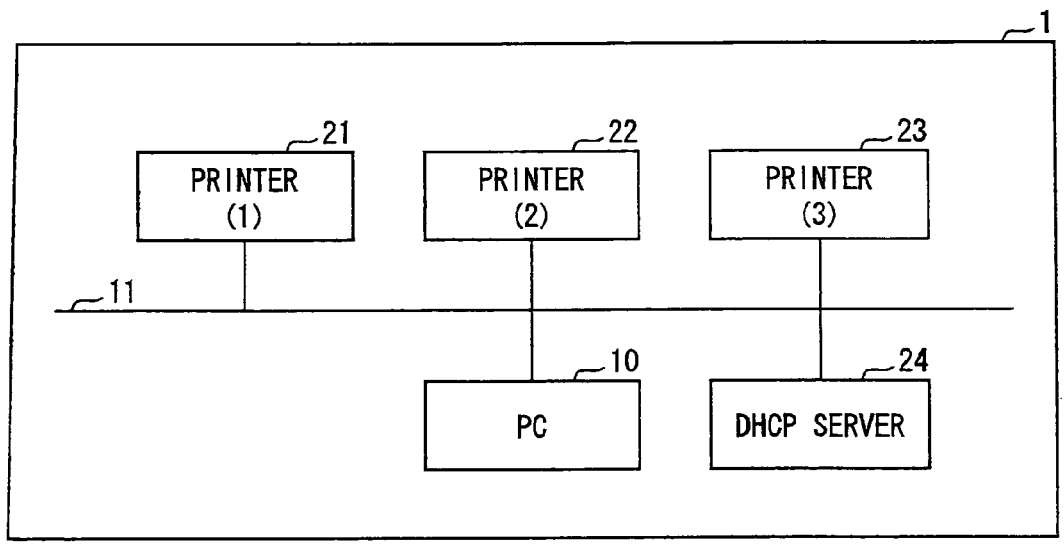
FIG. 1 is a block diagram illustrating a configuration of a first printing system of an embodiment of the present invention.

An embodiment of the present invention is described below with reference to the drawings. FIG. 1 is a block diagram illustrating a configuration of a first printing system 1 of an embodiment of the present invention. The first printing system 1 is provided in a first office.

As illustrated in FIG. 1, the first printing system 1 includes a first network 11, a first printer 21, a second printer 22, a third printer 23, and a DHCP (Dynamic Host Configuration Protocol) server 24. In the printing system 1, a personal computer (hereinafter referred to simply as "PC") 10 is connected to the first printer 21, the second printer 22, the third printer 23, and the DHCP server 24 via the first network 11. Note that each of the first printer 21, the second printer 22, and the third printer 23 may be an MFP (multi function printer), for example.

The PC 10 is, for example, a portable personal computer. A printer driver is installed in the PC 10. Accordingly, in the present embodiment, the PC 10 serves as a printer control apparatus. The printer driver is a so-called universal printer driver that can support a plurality of printers by itself.

The DHCP server 24 manages an IP address, a Subnet Mask, a Default Gateway, a DNS (Domain Name System) server address, a WINS (Windows Internet Name Service) server address etc. of the PC 10 connected to the first network 11, and provides the PC 10 with these information in response to a request from the PC 10.

In a state where the first printer 21, the second printer 22, and the third printer 23 are connected to the PC 10 via the first network 11 as illustrated in FIG. 1, extracted by a search conducted in the PC 10 are the first printer 21, the second printer 22, and the third printer 23.

Figure 2:
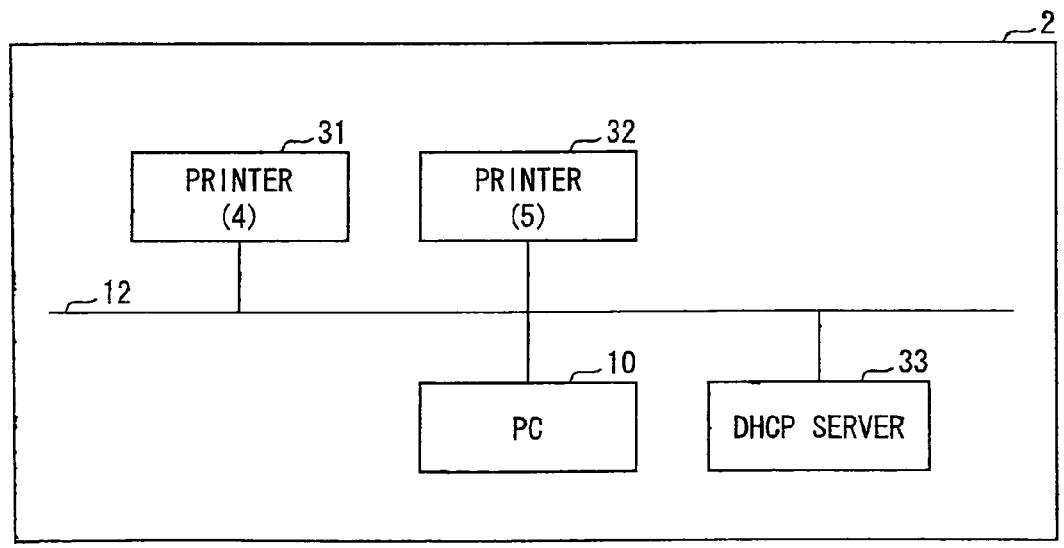
FIG. 2 is a block diagram illustrating a configuration of a second printing system of the embodiment of the present invention.

FIG. 2 is a block diagram illustrating a configuration of a second printing system 2 of the embodiment of the present invention. The second printing system 2 is provided in a second office.

As illustrated in FIG. 2, the second printing system 2 includes a second network 12, a first printer 31, a second printer 32, and a DHCP server 33. The PC 10 shown in FIG. 2 is identical to that shown in FIG. 1. Specifically, a user carries the PC10 from the first office to the second office, and connects the PC10 to the second network 12 of the second printing system 2.

In the second printing system 2, the PC 10 is connected to the first printer 31, the second printer 32, and the DHCP server 33 via the second network 12, as in the case of the first printing system 1. The DHCP server 33 has a similar configuration to the DHCP server 24, and manages network information similar to that managed in the DHCP server 24.

In a state where the first printer 31 and the second printer 32 are connected to the PC 10 via the second network 12 as illustrated in FIG. 2, extracted by a search conducted in the PC 10 are the first printer 31 and the second printer 32.

Figure 3:
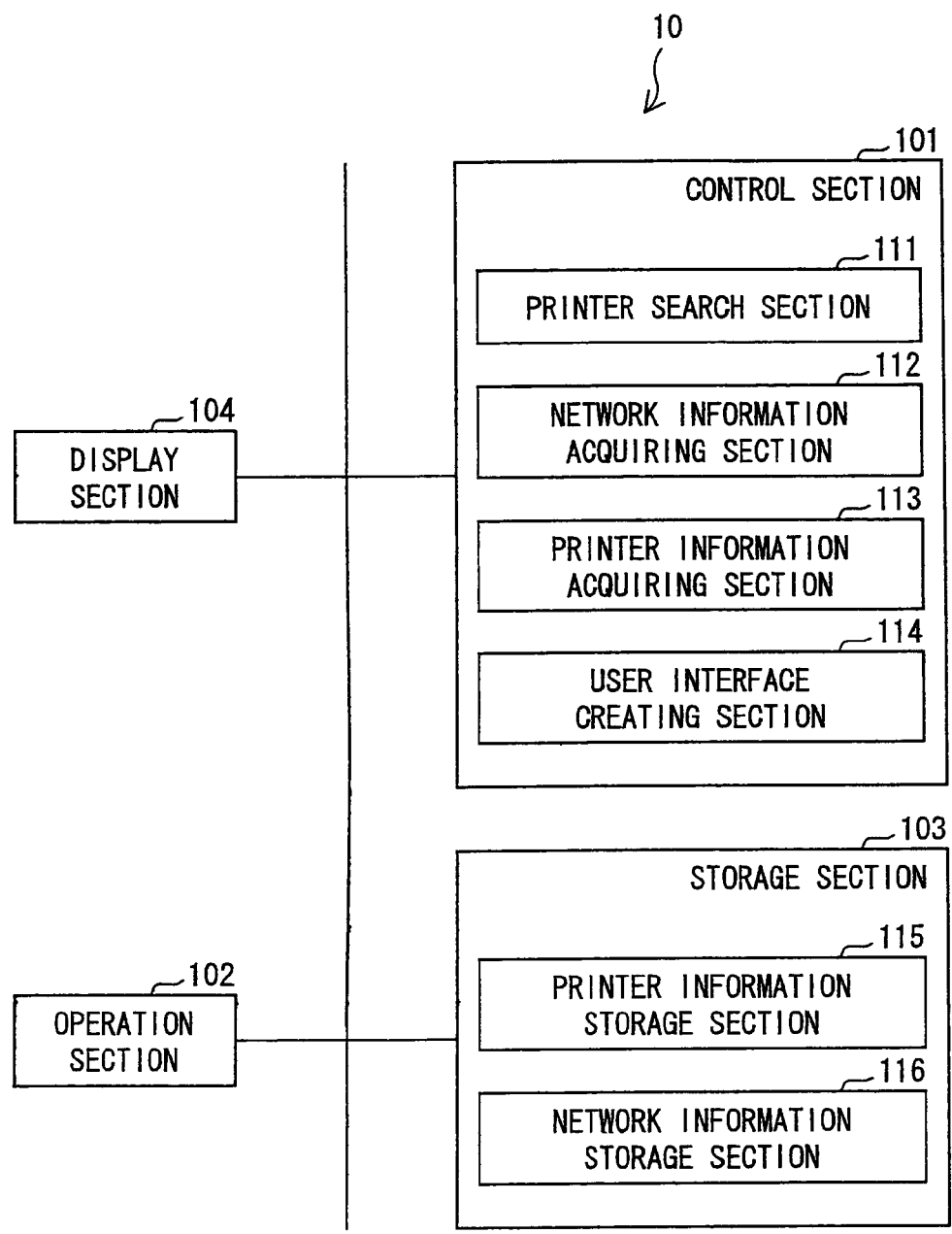
FIG. 3 is a block diagram illustrating a configuration of a PC shown in FIG. 1.

FIG. 3 is a block diagram illustrating a configuration of the PC 10 shown in FIG. 1. As illustrated in FIG. 3, the PC 10 includes a control section 101, an operation section 102, a storage section 103, and a display section 104.

The storage section 103 serves as a printer information storage section (printer information storage means) 115 and a network information storage section (network information storage means) 116.

The control section 101 serves as a printer search section 111, a network information acquiring section 112, a printer information acquiring section 113, and a user interface creating section 114.

In a case where the PC 10 is connected, for example, to the first network 11, the printer search section 111 conducts a search so as to extract the first printer 21, the second printer 22, and the third printer 23 connected to the first network 11. Thus, the printer search section 111 acquires printer information indicative of the printers connected to the first network 11 (information concerning the first printer 21, the second printer 22, and the third printer 23). The printer information thus acquired is stored in the printer information storage section 115.

The network information acquiring section 112 acquires network information for determining whether or not a second network connected to the PC 10 this time is identical to a first network connected to the PC 10 previous time. The network information thus acquired is stored in the network information storage section 116.

The printer information acquiring section 113 compares network information of the second network and network information of the first network. In a case where the network information of the second network is different from the network information of the first network, the printer information acquiring section 113 causes the printer search section 111 to conduct a search. Thus, the printer information acquiring section 113 acquires the printer information from the printer search section 111. Meanwhile, in a case where the network information of the second network is identical to the network information of the first network, the printer information acquiring section 113 acquires, from the printer information storage section 115, printer information that is already stored in the printer information storage section 115 without causing the printer search section 111 to conduct a search.

The user interface creating section 114 creates, based on the printer information acquired by the printer information acquiring section 113, a user interface for accepting a user's designation as to conditions for a printer to be selected. The user interface thus created is displayed on the display section 104.

The control section 101 controls all functions concerning the user interface, including the process of causing the display section 104 to display the user interface. For example, the control section 101 judges which printer has been set as a default printer on the user interface, and changes a user interface (option, printing preferences) for a printer driver and a print port on the basis of a result of the judgment.

The operation section 102 includes a mouse and a keyboard for example, and sends a user's operation inputted with the use of these devices to the control section 101. The storage section 103 is realized by a storage medium such as a hard disc or a memory. The storage section 103 stores information such as registered printers, a default printer, and printer configuration information. The display section 104 includes a display device, and causes the display device to display various information in accordance with an instruction from the control section 101.

Figure 4:
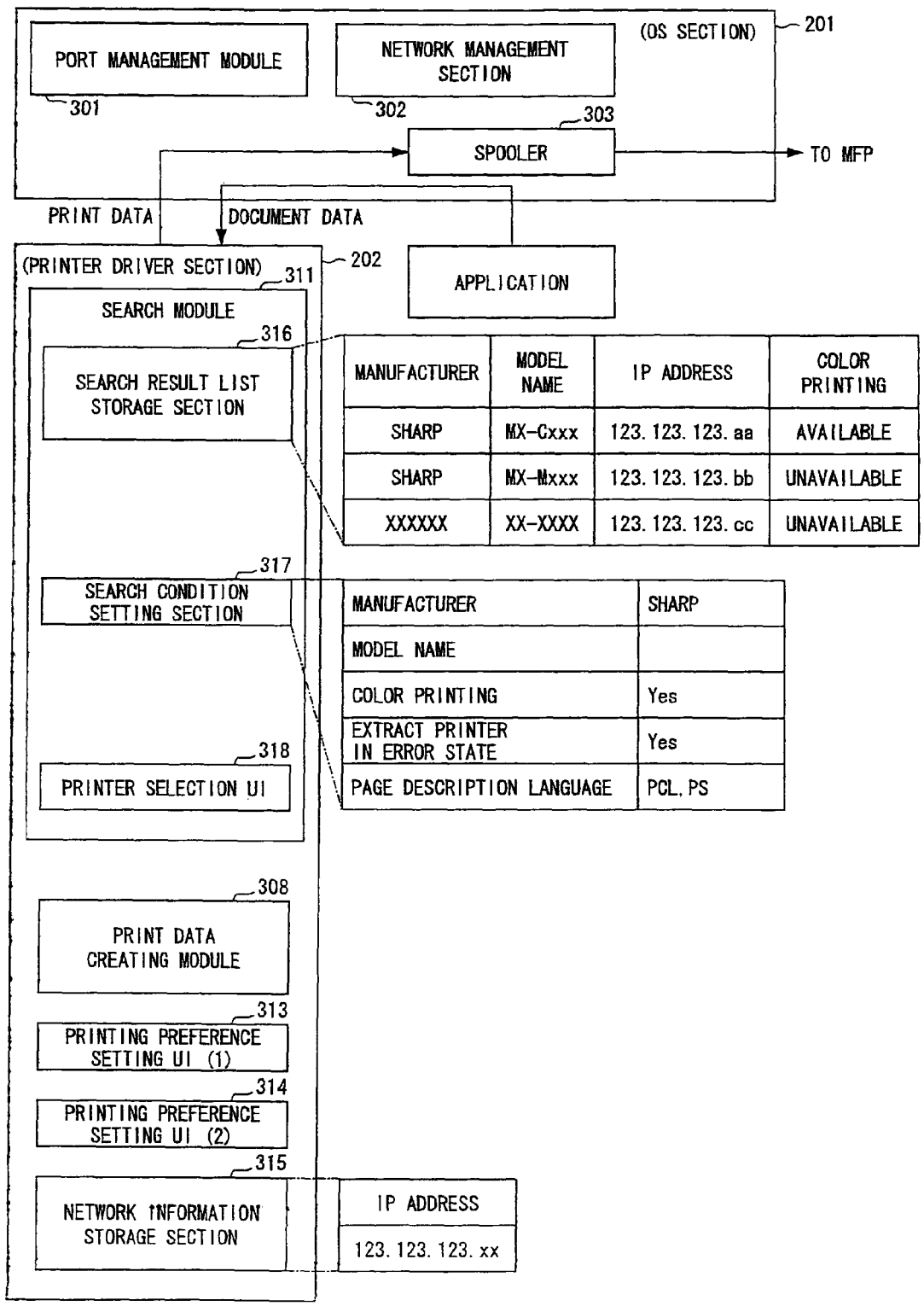
FIG. 4 is a block diagram illustrating a specific configuration of a control section shown in FIG. 3.

FIG. 4 is a block diagram specifically illustrating a configuration of the control section 101 shown in FIG. 3. As illustrated in FIG. 4, the control section 101 includes an OS section 201 and a printer driver section 202.

The OS section 201 is realized by an OS (operating system) installed in the PC 10. The OS section 201 includes a port management module 301, a network management section 302, and a spooler 303.

The port management module 301 assigns an IP address of a printer to a printer output port. The network management section 302 manages network information, such as an IP address, a Subnet Mask, a Default Gateway, a DNS server address, and a WINS server address of the PC 10, which is necessary to connect the PC10 to a network, and asks the DHCP server 24 for the network information as necessary.

That is, the DHCP server 24 manages, as network information, the IP address, Subnet Mask, Default Gateway, DNS server address, and WINS server address of the PC 10 as described above, and these network information can be acquired from the DHCP server 24.

The spooler 303 temporarily stores a printing request from the printer driver section 202 so that the printing request can be efficiently made to the first printer 21, the second printer 22 or the third printer 23.

The printer driver section 202 is realized by a printer driver installed in the PC 10. Specifically, the printer driver section 202 is realized by the control section 101 shown in FIG. 3 which executes a function as a printer driver.

The printer driver section 202 includes a search module (printer information acquiring section) 311, a print data creating module 308, a first printing preference setting UI (user interface) creating section 313, a second printing preference setting UI (user interface) creating section 314, and a network information storage section 315.

The search module 311 includes a printer search result list storage section 316, a search condition setting section 317, and a printer selection UI creating section 318.

A relationship between the arrangement shown in FIG. 3 and the arrangement shown in FIG. 4 is as follows: (i) the printer search section 111, the network information acquiring section 112, and the printer information acquiring section 113 correspond to the search module 311, (ii) the user interface creating section 114 corresponds to the search condition setting section 317, (iii) the printer information storage section 115 corresponds to the printer search result list storage section 316, and (iv) the network information storage section corresponds to the network information storage section 315.

The search module 311 causes the display section 104 to display a user interface for printer search that is created by a printer driver. The search module 311 conducts a search for printers based on a user's input to the user interface. A search result of the search conducted by the search module 311 is stored in the printer search result list storage section 316.

In the first printing system 1 for example, the search conducted by the search module 311 is targeted at the first printer 21, the second printer 22, and the third printer 23 that are connected to the first network 11. In this case, the search is conducted by a method of extracting all the printers that are ON at the start of the search, a method of extracting printers having a designated IP address, a method of extracting printers of a specific model or a method of extracting printers included in a designated subnet.

For example, the method of extracting printers having a designated IP address allows only printers located within a predetermined area (e.g., printers located on an identical floor of a building) to be extracted in a case where IP addresses of the first printer 21, the second printer 22, and the third printer 23 are set based on their locations.

The search result stored in the printer search result list storage section 316 includes, for example, manufacturers of the printers, model names of the printers, IP addresses, names of the printers, and availability of color printing.

Figure 5:
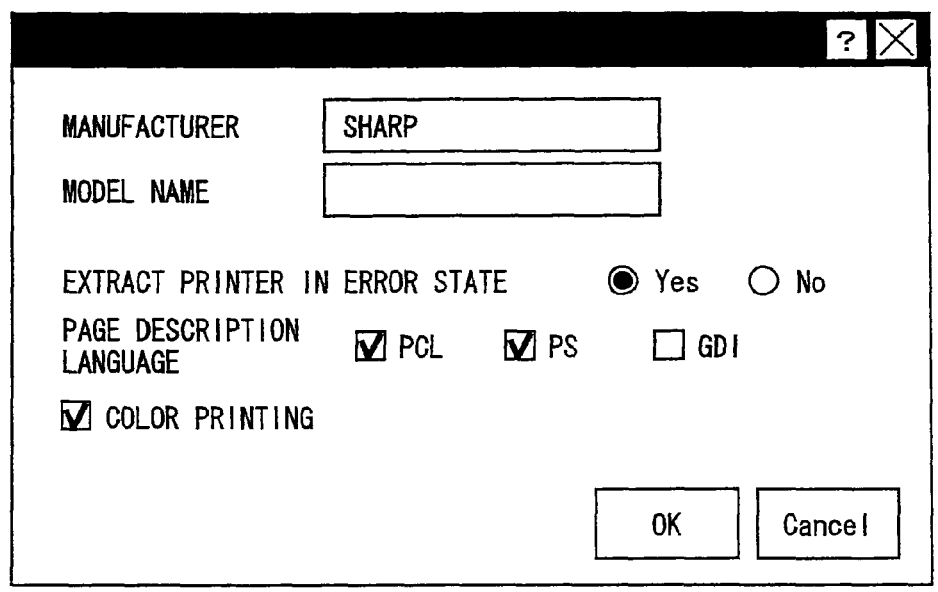
FIG. 5 is an explanatory view illustrating an example of a user interface for setting of printer search conditions which user interface is created by a search condition setting section shown in FIG. 4.

The search condition setting section 317 manages printer search conditions. Examples of the search conditions include manufacturers of printers, model names of the printers, presence or absence of an error, page description language (e.g., PCL (Printer Control Language), PS (Post Script), GDI (Graphics Device Interface)) and availability of color printing. The search condition setting section 317 stores these search conditions. The search condition setting section 317 creates a user interface which enables a user to determine the search conditions thus stored, and causes the display section 104 to display the user interface. FIG. 5 is an explanatory view illustrating an example of the user interface for determining the printer search conditions.

Figure 6:
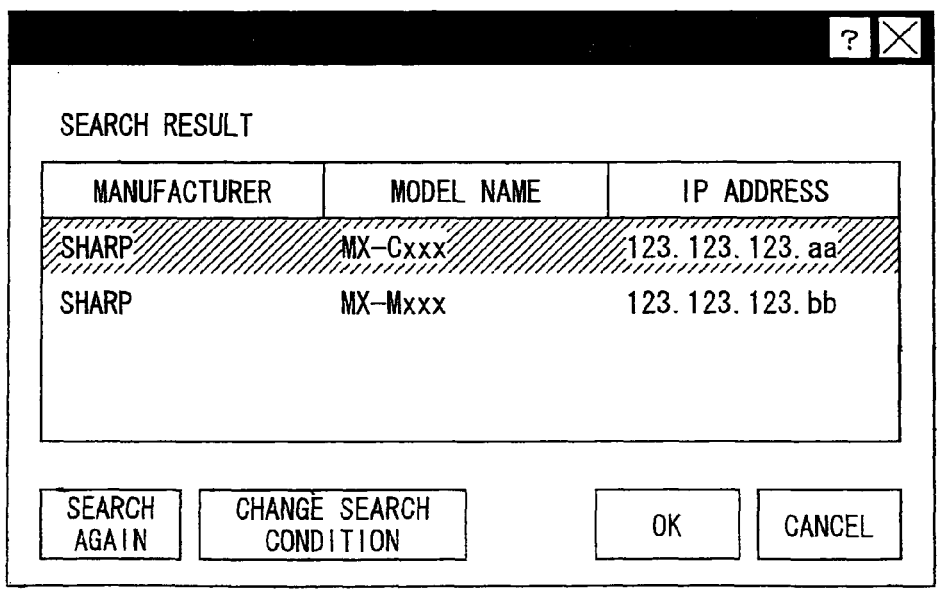
FIG. 6 is an explanatory view illustrating an example of a user interface for determining conditions for a printer designated as a destination printer which user interface is created by a printer selection UI creating section shown in FIG. 4.

The printer selection UI creating section 318 creates a user interface for selecting conditions for a printer that is conclusively decided as a destination printer on the basis of (i) the information stored in the printer search result list storage section 316, i.e., information indicative of printers extracted by a search (e.g., information indicative of the first printer 21, the second printer 22, and the third printer 23 that are connected to the first network 11 in the first printing system 1) and (ii) the information stored in the search condition setting section 317, i.e., information indicative of printer search conditions. Then, the printer selection UI creating section 318 causes the display section 104 to display the user interface thus created. FIG. 6 is an explanatory view showing an example of the user interface for selecting conditions for a printer that is conclusively decided as a destination printer.

The printer driver section 202 can decide the destination printer in response to a user's input to the user interface shown in FIG. 6.

The print data creating module 308 designates locations of characters, figures etc. on a page to be printed.

Figure 7:
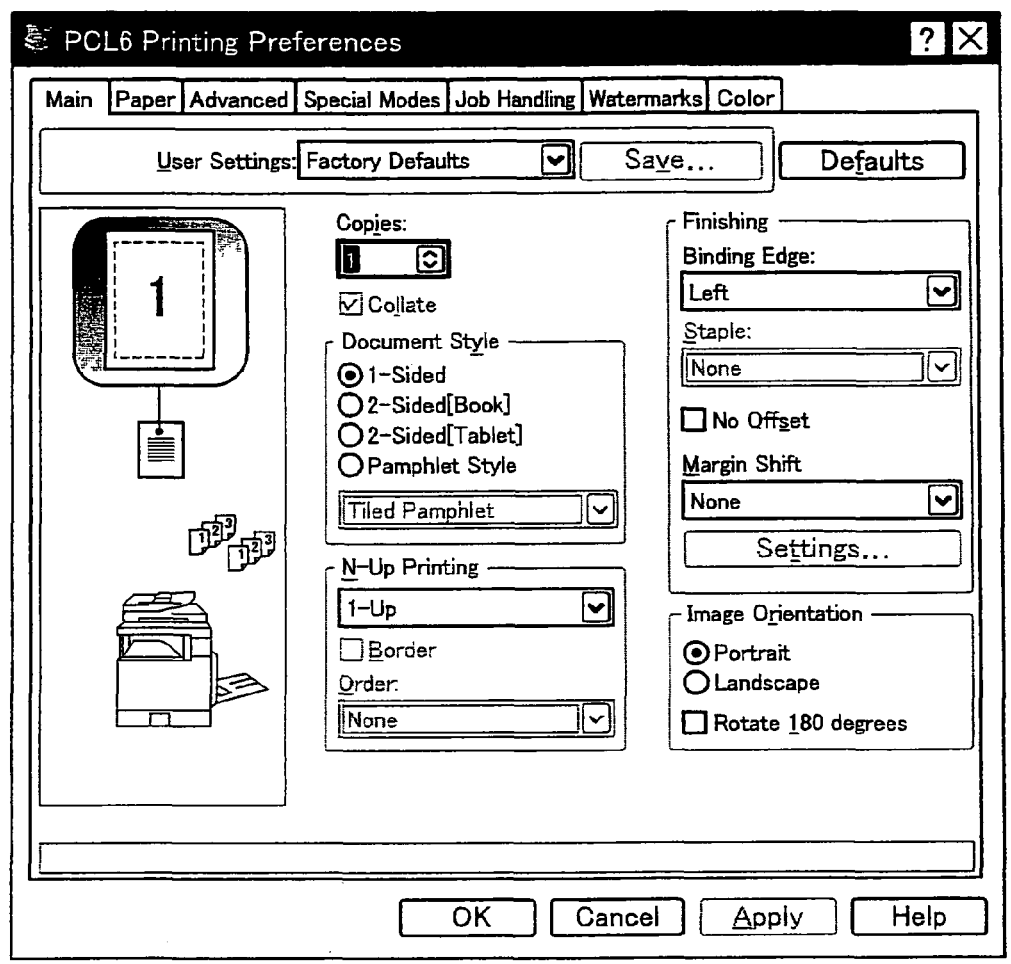
FIG. 7 is an explanatory view illustrating a user interface for setting of printing preferences for a first printer and a second printer shown in FIG. 1 which user interface is created by a first printing preference setting UI creating section shown in FIG. 4.
Figure 8:
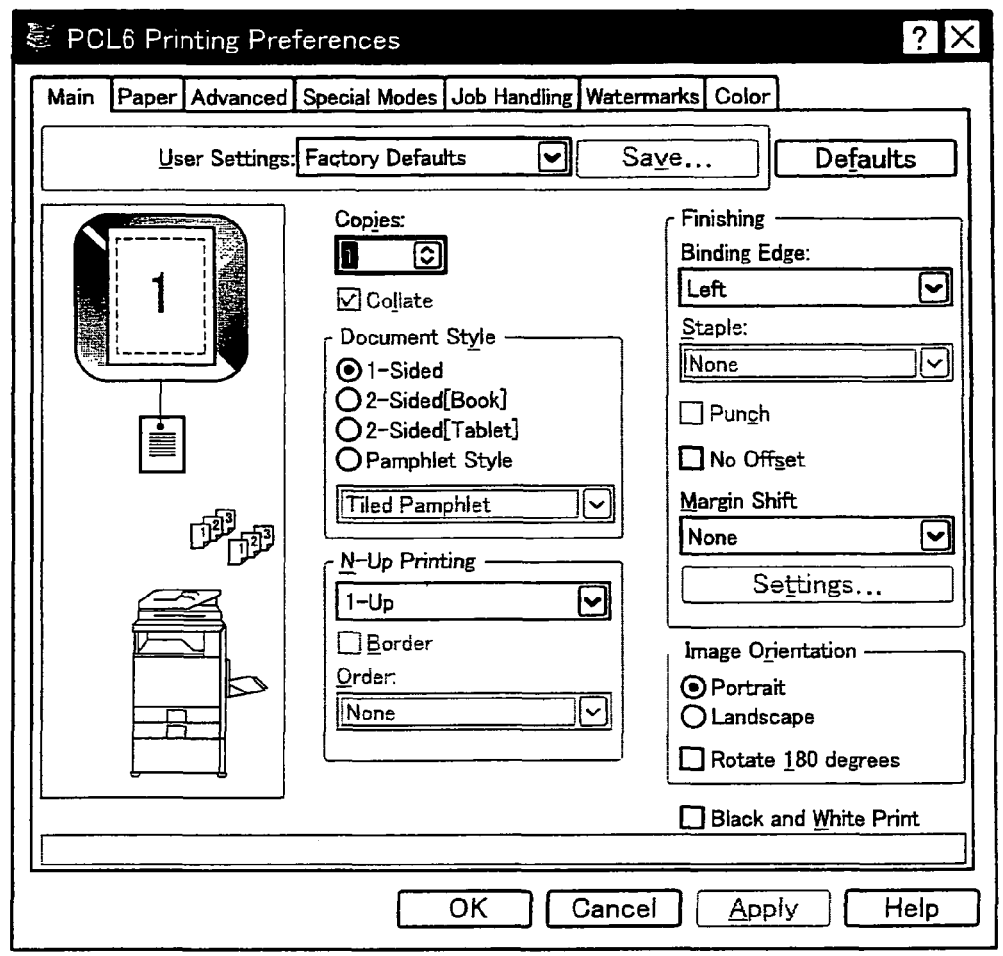
FIG. 8 is an explanatory view illustrating a user interface for setting of printing preferences for a third printer shown in FIG. 1 which user interface is created by a second printing preference setting UI creating section shown in FIG. 4.

The first printing preference setting UI creating section 313 creates a user interface (see FIG. 7) for setting of printing preferences for the first printer 21 and the second printer 22 shown in FIG. 1. The second printing preference setting UI creating section 314 creates a user interface (see FIG. 8) for setting of printing preferences for the third printer 23 shown in FIG. 1.

The network information storage section 315 acquires the network connection information of the PC 10 from the network management section 302 of the OS section 201, and then stores the network connection information in the network information storage section 315.

Figure 9:
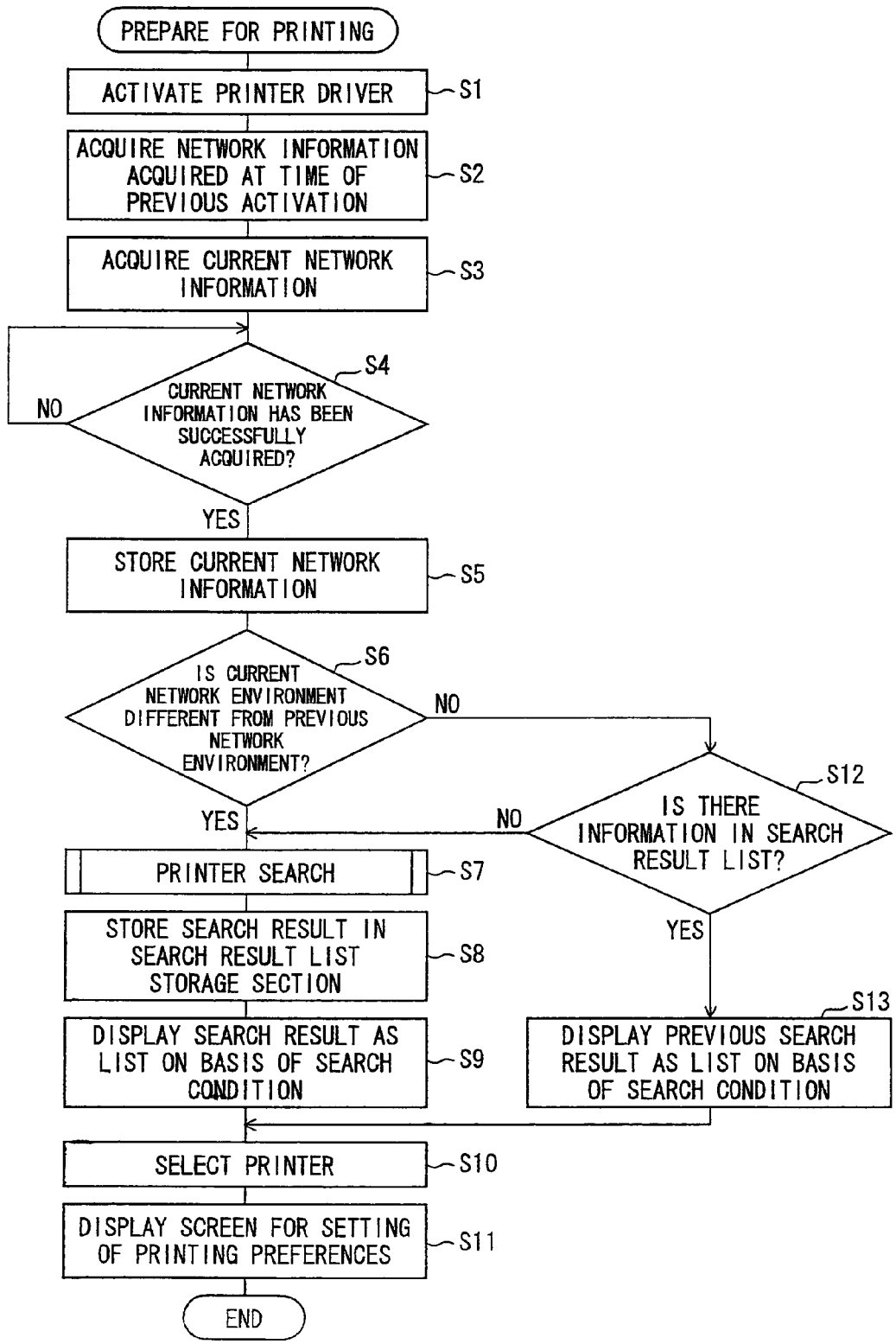
FIG. 9 is a flowchart showing how a PC serving as a printer control apparatus of an embodiment of the present invention operates.

With reference to the flowchart of FIG. 9, the following description deals with how the PC 10 thus configured which serves as a printer control apparatus of the present embodiment operates. Note that the following description deals with a case where the PC 10 is first connected to the first network 11 of the first printing system 1.

When the PC 10 is connected to the first network 11 in the printing system 1, a printer driver is activated in the PC 10 (S1).

When the printer driver is activated, the search module 311 of the printer driver section 202 acquires, with reference to the network information storage section 315, network information that was acquired at the time of previous activation of the printer driver (S2). In a case where no network information is stored in the network information storage section 315, it is determined that "there is no network information". Note that it is determined that "there is no network information" in a case where the PC 10 is connected to a network for the first time. Further, the search module 311 acquires, from the network management section 302 of the OS section 201, network information of the first network 11 to which the PC 10 is being currently connected (S3).

In a case where the network information of the first network 11 to which the PC 10 is being currently connected is successfully acquired (S4), the network information is stored in the network information storage section 315 (S5).

Next, the search module 311 compares, with reference to the network information stored in the network information storage section 315, the network information acquired at the time of previous activation and the network information acquired this time. The search module 311 thus judges whether or not the network information acquired this time is different from the network information acquired previous time, i.e., whether or not a network environment for the PC 10 has changed (S6). In a case where it has been determined that "there is no network information", the search module 311 judges that "the network environment has changed".

In a case where it is determined, as a result of the judgment, that the network environment has changed, the search module 311 conducts a search for the printers (the first printer 21, the second printer 22, and the third printer 23) connected to the first network 11 (S7), and then causes the printers (the first printer 21, the second printer 22, and the third printer 23) thus extracted by the search to be stored in the printer search result list storage section 316 (S8).

Next, the search condition setting section 317 of the search module 311 causes the display section 104 to display a user interface (e.g., the user interface shown in FIG. 5) for narrowing down the extracted printers connected to the first network 11 to a printer to be used. Then, when a user designates, on the user interface, conditions for the printer to be used, the search condition setting section 317 conducts a search based on the conditions thus designated, and then causes the display section 104 to display a search result as shown in FIG. 6 for example (S9).

Then, when the user selects the printer to be used based on the search result (S10), the printer selection UI creating section 318 of the search module 311 creates a user interface for setting of printing preferences (e.g., the user interface shown in FIG. 7 or the user interface shown in FIG. 8) which user interface corresponds to the printer thus selected, and then causes the display section 104 to display the user interface (S11).

Meanwhile, in a case where it is determined in S6 that the network environment for the PC 10 has not been changed, the search module 311 does not conduct a search for the first printer 21, the second printer 22, and the third printer 23 connected to the first network 11. In this case, the search condition setting section 317 of the search module 311 acquires, from the printer search result list storage section 316, a printer search result list created based on a previous search conducted through the first network 11 (S12).

Then, the search condition setting section 317 creates, based on the printer search result list thus acquired, a user interface (e.g., the user interface shown in FIG. 5) for finding out a printer to be used, and causes the display section 104 to display the user interface thus created. Then, when the user designates, on the user interface, conditions for the printer to be used, the search condition setting section 317 conducts a search based on the conditions thus designated, and then causes the display section 104 to display a search result as shown in FIG. 6 for example (S13). Then, the process proceeds on to S10.

Note that in a case where the printer search result list created based on the previous search cannot be acquired from the printer search result list storage section 316 in S12, the process proceeds on to S7 where a search for extracting the first printer 21, the second printer 22, and the third printer 23 connected to the first network 11 is conducted.

Note that the search module 311 judges in S6 whether or not the network environment has changed by judging whether or not the IP address and/or the Subnet Mask of the PC 10 that are network information have changed.

In a DHCP environment in which an IP address is not fixed, there is a possibility that whether or not the network environment has changed cannot be accurately determined just by judging whether or not an IP address has changed. In this case, whether or not the network environment has changed can be accurately determined by additionally judging whether or not the Default Gateway, DNA address, WNS address, and/or the like have changed.

The user interfaces created in S9 and S13 for finding out a printer to be used may allow a user to designate, as extraction conditions, whether or not a printer has an error (a printer that is not in an error state), a page description language (e.g., PCL, PS, GDI), a manufacturer, availability of color printing (a printer in which color printing is available), a printer model name etc.

For example, in the first printing system 1 shown in FIG. 1 and the second printing system 2 shown in FIG. 2, IP addresses, manufacturers, and availability of color printing of the first printer 21, the second printer 22, the third printer 23, the first printer 31, and the second printer 32 are set as shown in FIG. 10(a). Further, an IP address of the PC 10 in the first printing system 1 is different from that in the second printing system 2, as shown in FIG. 10(b).

In a case where the printer driver of the PC 10 is activated for the first time in the first network 11 of the first printing system 1 located in the first office, a previously used network environment is not stored in the network information storage section 315. Accordingly, it is determined that the network environment has changed. Then, after current network information is stored in the network information storage section 315, a search for the first printer 21, the second printer 22, and the third printer 23 is conducted, and a search result of the search is displayed on the display section 104. Here, in a case where the user designates SHARP as a manufacturer, the printers 21 and 22 are extracted.

In a case where the printer driver of the PC 10 is activated again in the first printing system 1 later, the network information does not change, and the previous network information is stored in the network information storage section 315. Consequently, it is possible to adjust setting of the printer driver in the PC 10 without conducting a search for the first printer 21, the second printer 22, and the third printer 23.

Meanwhile, in a case where the user moves the PC 10 from the first office to the second office and connects the PC 10 to the second printing system 2 so that the printer driver is activated, the network information stored in the network information storage section 315 is different from that of the second printing system 2 (the second network 12). Accordingly, it is determined that the network environment has changed. Then, after current network information is stored in the network information storage section 315, a search for the first printer 31 and the second printer 32 is conducted, and a search result of the search is displayed on the display section 104. Here, in a case where the user designates SHARP as a manufacturer, the printer 31 is extracted.

As described above, according to the PC 10 serving as a printer control apparatus of the embodiment of the present invention, in a case where network information (network environment) does not change, a search for printers connected to a network is not conducted at the time of activation of the printer driver, and a previous search result is utilized. This makes it unnecessary to conduct a search for printers every time the printer driver is activated. As a result, a user can speedily start setting of printing preferences, thereby allowing speedy printing.

Embodiment 2

Another embodiment of the present invention is described below with reference to the drawings.

In the above embodiment, the type of the first network and the second network 12 is not specified. In the present embodiment, it is assumed that any one of the first network 11 and the second network 12 is a network using wired connection (e.g., wired LAN (Local Area Network)) and the other one is a network using wireless connection (e.g., wireless LAN). Accordingly, in the present embodiment, the network information storage section 116 stores information about whether a network to which the PC 10 was connected previous time is wired LAN or wireless LAN.

Here, for example, it can be assumed that the PC 10 is connected to the first network 11 of the first office with relatively high frequency, and with relatively low frequency, the PC 10 is carried from the first office to an outside where the PC 10 is connected to the second network 12. In this case, the first network 11 is wired LAN, and the second network 12 is wireless LAN. Note that it is also possible that the first network 11 is wireless LAN and the second network 12 is wired LAN.

Next, with reference to FIG. 9, the following description deals with how the PC 10 operates based on the above assumption. Here, it is assumed that the PC 10 is connected to the first network 11 of the first printing system 1.

When the PC 10 is connected to the first network 11 in the first printing system 1, a printer driver is activated in the PC 10 (S1).

When the printer driver is activated, the search module 311 of the printer driver section 202 acquires, with reference to the network information storage section 315, network information that was acquired at the time of previous activation of the printer driver (S2). In a case where no network information is stored in the network information storage section 315, it is determined that "there is no network information". Note that it is determined that "there is no network information" in a case where the PC 10 is connected to a network for the first time. Further, the search module 311 acquires, from the network management section 302 of the OS section 201, network information of the first network 11 to which the PC 10 is being currently connected (S3). In this example, the network information thus acquired is information indicating that the first network 11 is wired LAN.

In a case where the network information of the first network 11 is successfully acquired (S4), the network information is stored in the network information storage section 315 (S5).

Next, the search module 311 compares, with reference to the network information stored in the network information storage section 315, the network information acquired at the time of previous activation and the network information acquired this time. The search module 311 thus judges whether or not the network information acquired this time is different from the network information acquired previous time, i.e., whether or not a network environment for the PC 10 has changed (S6). In a case where it has been determined that "there is no network information", the search module 311 judges that "the network environment has changed".

In a case where it is determined, as a result of the judgment, that the network environment has changed, the search module 311 conducts a search for the printers (the first printer 21, the second printer 22, and the third printer 23) connected to the first network 11 (S7), and then causes printer information of the printers (the first printer 21, the second printer 22, and the third printer 23) thus extracted by the search to be stored, as a printer list, in the printer search result list storage section 316 (S8).

Here, in a case where the PC 10 was connected to the second network 12 (wireless LAN) previous time, and is connected to the first network 11 (wire LAN) this time, it is determined in S6 that the network information acquired at the time of previous activation is different from the network information acquired this time. Accordingly, it is determined in S6 that the network environment for the PC 10 has changed.

The processes in S9 through S13 are identical to those described in the above embodiment.

According to the present embodiment, the network information is limited to information indicative of a network using wired connection and information indicative of a network using wireless connection. This allows simplification of information to be managed, thereby making the processes easy. This arrangement is effective, for example, in the situation in which the PC 10 is connected to the first network 11 using wired connection in a predetermined office with relatively high frequency, and with relatively low frequency, the PC 10 is carried from the office to an outside where the PC 10 is connected to the second network 12 using wireless connection.

Also in the present embodiment, in the PC 10 serving as a printer control apparatus, in a case where network information (network environment) does not change, a search for printers connected to a network is not conducted at the time of activation of the printer driver, and a previous search result is utilized. This makes it unnecessary to conduct a search every time the printer driver is activated. As a result, a user can speedily start setting of printing preferences, thereby allowing speedy printing.

Embodiment 3

Another embodiment of the present invention is described below with reference to the drawings.

The present embodiment discusses how the PC (printer control apparatus) 10 operates in a case where the PC 10 is first connected to the first network 11 and is then connected to the second network 12. Specifically, according to the present embodiment, in a case where a specific printer is selected as a destination printer under the environment of the first network 11 (in a state in which the PC 10 is connected to the first network 11), a printer whose model is identical to the printer selected under the environment of the first network 11 can be preferentially selected by a user under the environment of the second network 12 (in a state in which the PC 10 is connected to the second network 12). For this purpose, such a printer whose model is identical to the printer selected under the environment of the first network 11 is listed high on a printer list of the second network 12 that is presented to the user.

Figure 11:
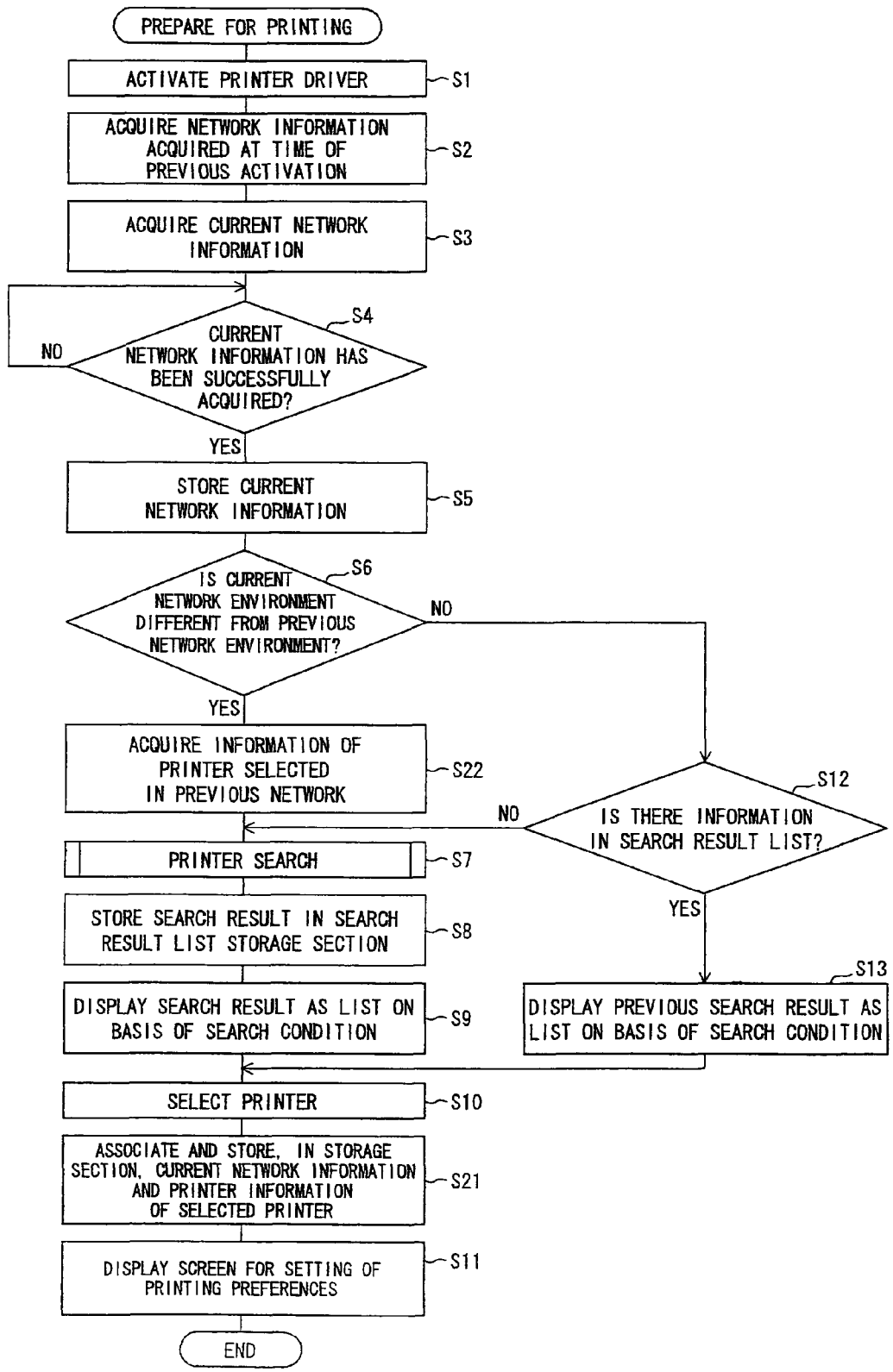
FIG. 11 is a flowchart showing how a PC serving as a printer control apparatus of another embodiment of the present invention operates.

With reference to the flowchart of FIG. 11, the following description deals with how the PC 10 serving as a printer control apparatus of the present embodiment operates.

In a state in which the PC 10 is connected to the first network 11, the above processes in S1 through S6 are carried out. Then, in a case where it is determined that the network environment has changed, the search module 311 conducts a search for the printers (the first printer 21, the second printer 22, and the third printer 23) connected to the first network 11 (S7), and causes printer information of the printers (the first printer 21, the second printer 22, and the third printer 23) thus extracted by the search to be stored in the printer search result list storage section 316 (S8).

As described later, the process in S22 is carried out in a case where it is determined in S6 that the network environment has changed and where printer information of a printer selected in a previous network is stored in the printer search result list storage section 316 in a manner such that the printer information is associated with network information of the previous network.

Next, the search condition setting section 317 of the search module 311 causes the display section 104 to display, as a printer list, the extracted printers connected to the first network 11 as shown in FIG. 6 for example (S9).

Then, when a user selects a printer to be used from the printer list (S10), the search module 311 causes network information of a network to which the PC 10 is currently connected (network information of the first network 11) to be associated with printer information of the printer thus selected (printer information of the selected printer) and to be stored, as history, in the printer search result list storage section 316 of FIG. 4 (the printer information storage section 115 of FIG. 3) (S21). Note that the printer information of the selected printer includes a model name of the selected printer.

Further, the printer selection UI creating section 318 of the search module 311 creates a user interface for setting of printing preferences (e.g., the user interface shown in FIG. 7 or the user interface shown in FIG. 8) which user interface corresponds to the selected printer, and causes the display section 104 to display the user interface thus created (S11). The processes in S12 and S13 are identical to those described before.

Next, in a case where the PC 10 is connected to the second network 12 instead of the first network 11, the processes in S1 through S5 are carried out in a similar manner.

Then, in a case where it is determined in S6 that the network environment has changed, the search module 311 conducts a search through the history stored in the printer search result list storage section 316 by using the network information of the previous network as a search key. Thus, the search module 311 acquires the printer information of the selected printer in the previous network (the first network 11) which printer information is associated with the network information of the previous network (the first network 11) (S22).

Further, the search module 311 conducts a search for the printers (the first printer 31 and the second printer 32) connected to the second network 12 (S7), and causes printer information of the printers (the first printer 31 and the second printer 32) thus extracted by the search to be stored in the printer search result list storage section 316 (S8).

Next, the search condition setting section 317 of the search module 311 conducts a search for extracting a printer whose model name is identical to that of the selected printer from among the printers extracted in S8 by using the model name of the selected printer as a search condition. Then, in a case where the printers connected to the second network 12 include the printer whose model name is identical to that of the selected printer, the search condition setting section 317 causes the display section 104 to display a model name list for the second network 12 in which list the model name of the printer is listed high (e.g., listed at the top), as shown in FIG. 6 for example (S9).

Then, when a user selects a printer to be used from the printer list (S10), the search module 311 causes network information of a network to which the PC 10 is currently connected (network information of the second network 12) and printer information of the printer thus selected (printer information of the selected printer) to be associated with each other and to be stored, as history, in the printer search result list storage section 316 of FIG. 4 (the printer information storage section 115 of FIG. 3) (S21).

Further, the printer selection UI creating section 318 of the search module 311 creates a user interface for settings of printing preferences (e.g., the user interface shown in FIG. 7 or the user interface shown in FIG. 8) which user interface corresponds to the selected printer, and causes the display section 104 to display the user interface thus created (S11). The processes in S12 and S13 are identical to those described before.

In the present embodiment, in a case where (i) the network environment has changed, for example from the first network 11 to the second network 12, (ii) printer information of a selected printer selected in a previous network is stored in the printer search result list storage section 316 so that the printer information is associated with network information of the previous network, and (iii) the printers connected to the second network 12 include a printer whose model name is identical to that of the selected printer, the display section 104 displays a model name list of the second network 12 so that the model name of such a printer is listed high on the model name list.

Consequently, even in a case where a current network environment is different from a previous one, a user can easily select, as a destination printer in the current network environment, a familiar printer used in the previous network environment.

Also in the present embodiment, in the PC 10 serving as a printer control apparatus, in a case where network information (network environment) does not change, a search for printers connected to a network is not conducted at the time of activation of the printer driver, and a previous search result is utilized. This makes it unnecessary to conduct a search every time the printer driver is activated. As a result, a user can speedily start setting of printing preferences, thereby allowing speedy printing.

Embodiment 4

Another embodiment of the present invention is described below with reference to the drawings.

In the present embodiment, in a case where the PC (printer control apparatus) 10 is connected to the first network 11 for example, printer information of the printers connected to the first network 11 which printer information is acquired by a search conducted through the first network 11 by the PC 10 is stored as history, and then in a case where the PC 10 is connected to the first network 11 again, the printer information thus stored is utilized. The following describes how the PC 10 operates in a case where the PC 10 is first connected to the first network 11, and is then connected to the second network 12.

Figure 12:
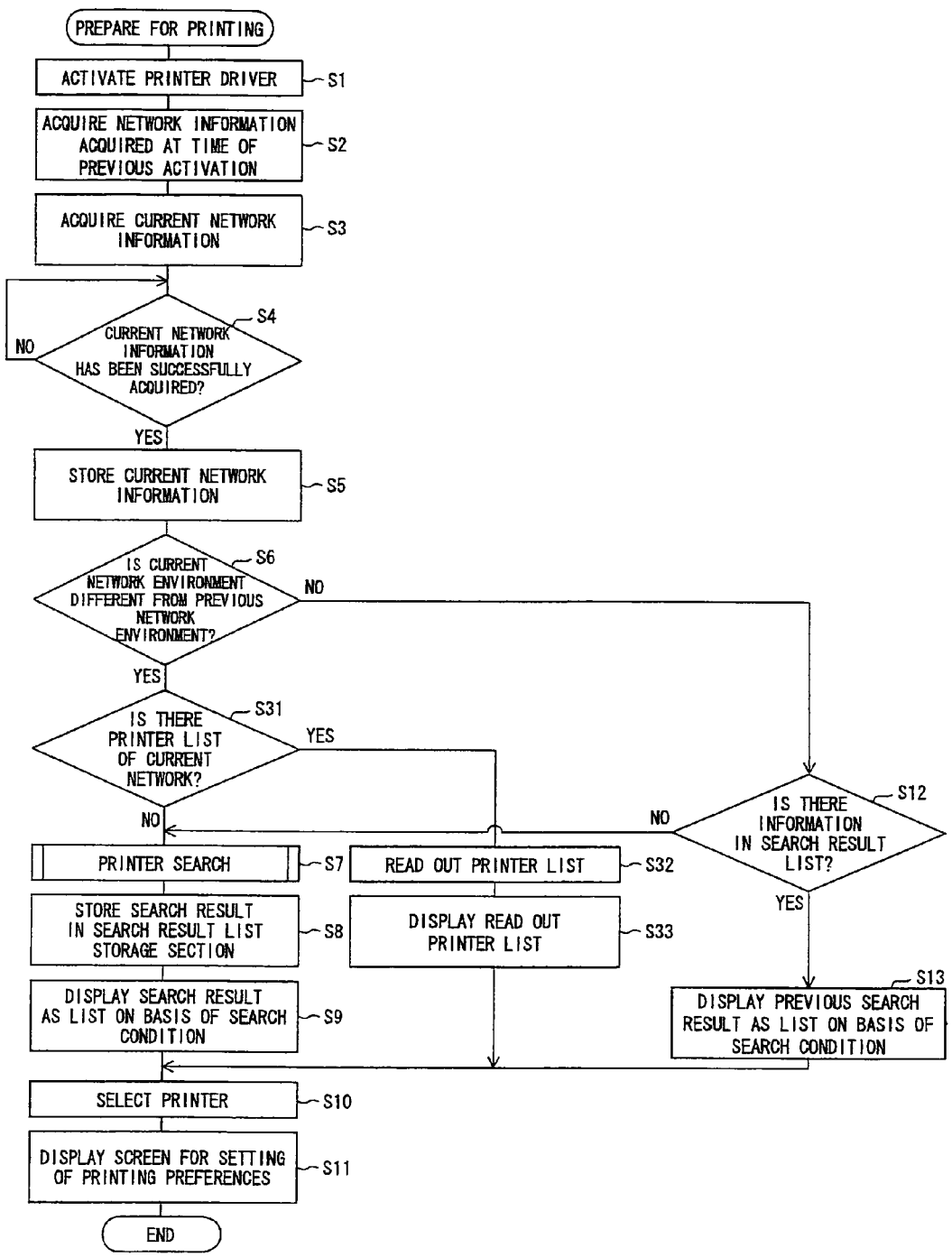
FIG. 12 is a flowchart showing how a PC serving as a printer control apparatus of still another embodiment of the present invention operates.

With reference to the flowchart of FIG. 12, the following description deals with how the PC 10 serving as a printer control apparatus of the present embodiment operates.

In a state in which the PC 10 is connected to the first network 11, the above processes in S1 through S6 are carried out. Then, in a case where it is determined that the network environment has changed, the search module 311 conducts a search for the printers (the first printer 21, the second printer 22, and the third printer 23) connected to the first network 11 (S7), and causes printer information of the printers (the first printer 21, the second printer 22, and the third printer 23) thus extracted by the search to be stored, as a printer list, in the printer search result list storage section 316 (S8).

In this case, current network information, i.e., network information of the first network 11 and the printer list of the printers connected to the first network 11 are associated with each other, and are stored as history in the printer search result list storage section 316. Note that the printer list contains printer information of the printers. The printer information is detailed information concerning the printers, such as functions and performance of the printers, which is necessary for a user to decide a printer to be used.

Next, the search condition setting section 317 of the search module 311 causes the display section 104 to display, as a printer list, the extracted printers connected to the first network 11 as shown in FIG. 6 for example (S9).

Then, when the user selects the printer to be used from the printer list (S10), the printer selection UI creating section 318 of the search module 311 creates a user interface for setting of printing preferences (e.g., the user interface shown in FIG. 7 or the user interface shown in FIG. 8) which user interface corresponds to the printer thus selected, and then causes the display section 104 to display the user interface (S11). The processes in S12 and S13 are identical to those described before.

Next, in a case where the PC 10 is connected to the second network 12 instead of the first network 11, the processes in S1 through S5 are carried out.

Then, in a case where it is determined in S6 that the network environment has changed, the search module 311 judges whether or not a printer list of the current network (the second network 12) is stored in the printer search result list storage section 316 (S31). In this case, the search module 311 conducts a search through the history in the printer search result list storage section 316 by using, as a search condition, the network information of the second network 12. In a case where it is determined, as a result of the judgment, that the printer list of the second network 12 is not stored in the printer search result list storage section 316, the process proceeds on to S7 and the subsequent steps. The processes in S7 and the subsequent steps are identical to those described before.

Meanwhile, in a case where it is determined, as a result of the judgment in S31, that the printer list of the second network 12 is stored in the printer search result list storage section 316, the printer list is read out (S32).

Next, the search module 311 causes the display section 104 to display, as a model name list of the second network 12, the printer list thus read out (S33). Then, the processes in S10 and the subsequent steps are carried out.

In the present embodiment, in a case where the network environment has changed (in a case where a network to which the PC 10 is currently connected is changed, for example, from the first network 11 to the second network 12), it is examined whether or not a printer list of the current network acquired in the past is stored in the printer search result list storage section 316. In a case where the printer list of the current network acquired in the past is stored in the printer search result list storage section 316, the printer list is utilized. This eliminates the need for the process of newly acquiring the printer list of the current network. Consequently, the printer list of the current network can be speedily presented to a user.

Also in the present embodiment, in the PC 10 serving as a printer control apparatus, in a case where network information (network environment) does not change, a search for printers connected to a network is not conducted at the time of activation of the printer driver, and a previous search result is utilized. This makes it unnecessary to conduct a search every time the printer driver is activated. As a result, a user can speedily start setting of printing preferences, thereby allowing speedy printing.

The printer control apparatus may be arranged to further include a user interface creating section that creates, based on the printer information acquired by the printer information acquiring section, a user interface for accepting a user's designation as to conditions for a printer to be selected.

According to the arrangement, the user interface creating section creates, based on the printer information acquired by the printer information acquiring section, a user interface for accepting a user's designation as to conditions for a printer to be selected. This allows the user to designate the conditions for the printer to be selected.

The printer control apparatus may be arranged such that the network information is at least one of an IP address of the printer control apparatus in the network to which the printer control apparatus is connected, a Subnet Mask of the printer control apparatus, a Default Gateway of the printer control apparatus, a DNS address of the printer control apparatus, and a WINS address of the printer control apparatus.

According to the arrangement, it is possible to easily determine, based on any of the network information, whether or not the second network is identical to the first network.

The printer control apparatus may be arranged such that: each of the first network and the second network is a network using wireless connection or a network using wired connection, the network information is information indicative of the network using wired connection or information indicative of the network using wireless connection, the printer information acquiring section determines that the network information of the second network is identical to the network information of the first network in a case where both of the network information of the second network and the network information of the first network is the information indicative of the network using wired connection or in a case where both of the network information of the second network and the network information of the first network is the information indicative of the network using wireless connection, whereas the printer information acquiring section determines that the network information of the second network is different from the network information of the first network in a case where one of the network information of the second network and the network information of the first network is the information indicative of the network using wired connection and the other one of the network information of the second network and the network information of the first network is the information indicative of the network using wireless connection.

According to the arrangement, the network information is limited to information indicative of a network using wired connection and information indicative of a network using wireless connection. This allows simplification of information to be managed, thereby making the processes easy. This arrangement is effective, for example, in the situation in which the printer control apparatus is connected to the first network using wired connection in a predetermined office with relatively high frequency, and with relatively low frequency, the printer control apparatus is carried from the office to an outside where the printer control apparatus is connected to the second network using wireless connection.

The printer control apparatus may be arranged to further include a printer list creating section that (i) creates a printer list that shows, as a list of the printers connected to the network to which the printer control apparatus is currently connected, the printer information acquired by the printer information acquiring section, (ii) causes printer information of a selected printer which is a printer selected from the printer list by a user to be associated with the network information of the network to which the printer control apparatus is currently connected and to be stored in the printer information storage means, and (iii) causes the printer information of the selected printer to be listed high on the printer list in a case where the printer information acquiring section determines that the network information of the second network is different from the network information of the first network and where the printer information acquired by the printer information acquiring section includes the printer information of the selected printer.

According to the arrangement, even in a case where the second network connected to the printer control apparatus this time is different from the first network connected to the printer control apparatus previous time, printer information of a printer selected by a user is listed high on the printer list of the second network, provided that the printer information of the second network includes the printer information of the printer selected by the user in the first network.

This allows the user to select, as a destination printer in a current network environment, a familiar printer used in a previous network environment even in a case where the current network environment is different from the previous network environment.

Finally, the blocks of the PC 10 serving as a printer control apparatus, especially the control section 101 may be realized by way of hardware or software as executed by a CPU as follows:

The PC 10 includes a CPU (central processing unit) and memory devices (memory media). The CPU (central processing unit) executes instructions in control programs realizing the functions. The memory devices include a ROM (read only memory) which contains programs, a RAM (random access memory) to which the programs are loaded, and a memory containing the programs and various data. The objective of the present invention can also be achieved by mounting to the PC 10 a computer-readable storage medium containing control program code (executable program, intermediate code program, or source program) for the PC 10, which is software realizing the aforementioned functions, in order for the PC 10 (or CPU, MPU) to retrieve and execute the program code contained in the storage medium.

The storage medium may be, for example, a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

The PC 10 may be arranged to be connectable to a communications network so that the program code may be delivered over the communications network. The communications network is not limited in any particular manner, and may be, for example, the Internet, an intranet, extranet, LAN, ISDN, VAN, CATV communications network, virtual dedicated network (virtual private network), telephone line network, mobile communications network, or satellite communications network. The transfer medium which makes up the communications network is not limited in any particular manner, and may be, for example, wired line, such as IEEE 1394, USB, electric power line, cable TV line, telephone line, or ADSL line; or wireless, such as infrared radiation (IrDA, remote control), Bluetooth (Registered Trademark), 802.11 wireless, HDR, mobile telephone network, satellite line, or terrestrial digital network. The present invention encompasses a computer data signal embedded in a carrier wave in which computer data signal the program code is embodied electronically.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The configuration of the present invention can be applied not only to a printer driver, but also to a driver, such as a scanner driver or a PC-Fax driver, in which any one device is selected from a plurality of devices.

REFERENCE SIGNS LIST

1: First printing system
2: Second printing system
10: Personal computer (printer control apparatus)
11: First network
12: Second network
21: First printer
22: Second printer 23: Third printer
24: DHCP server
31: First printer
32: Second printer
33: DHCP server
101: Control section
102: Operation section
103: Storage section
111: Printer search section
112: Network information acquiring section
113: Printer information acquiring section
114: User interface creating section
115: Printer information storage section (printer information storage means)
116: Network information storage section (network information storage means)
201: OS section
311: Printer search module (printer information acquiring section)

The invention claimed is:

1. A printer control apparatus which controls plural kinds of printers by use of a universal printer driver which is capable of communicating with the plural kinds of printers via a network and which supports the plural kinds of printers,
the printer control apparatus comprising:
printer information storage means;
a printer search section that conducts a search for printers connected to the network, acquires printer information indicative of the printers thus extracted by the search, and causes the printer information thus acquired to be stored in the printer information storage means;
network information storage means;
a network information acquiring section that acquires network information for determining whether or not a second network connected to the printer control apparatus this time is identical to a first network connected to the printer control apparatus previous time and that causes the network information thus acquired to be stored in the network information storage means;
a printer information acquiring section that compares network information of the second network and network information of the first network, and in a case where the network information of the second network is different from the network information of the first network, the printer information acquiring section acquiring the printer information from the printer search section by causing the printer search section to conduct the search, whereas in a case where the network information of the second network is identical to the network information of the first network, the printer information acquiring section acquiring the printer information from the printer information storage means without causing the printer search section to conduct the search; and
a printer list creating section that (i) creates a printer list that shows, as a list of printers connected to the network to which the printer control apparatus is currently connected, the printer information acquired by the printer information acquiring section and (ii) causes printer information of a selected printer which is a printer selected from the printer list by a user to be associated with the network information of the network to which the printer control apparatus is currently connected and to be stored in the printer information storage means,
the printer information containing at least information indicative of model names of the respective printers corresponding to the printer information,
in a case where (i) the printer information acquiring section determines that the network information of the second network is different from the network information of the first network and (ii) printer information, which is acquired by the printer information acquiring section, of printer connected to the second network contains printer information of a printer whose model name is identical to that of the selected printer which has been selected by the user while the selected printer is being connected to the first network, the printer list creating section causing the printer information of the printer, whose model name is identical to that of the selected printer, to be listed high on the printer list.

2. The printer control apparatus according to claim 1, further comprising a user interface creating section that creates, based on the printer information acquired by the printer information acquiring section, a user interface for accepting a user's designation as to conditions for a printer to be selected.

3. The printer control apparatus according to claim 1, wherein the network information is at least one of an IP address of the printer control apparatus in the network to which the printer control apparatus is connected, a Subnet Mask of the printer control apparatus, a Default Gateway of the printer control apparatus, a DNS address of the printer control apparatus, and a WINS address of the printer control apparatus.

4. The printer control apparatus according to claim 1, wherein:
each of the first network and the second network is a network using wireless connection or a network using wired connection,
the network information is information indicative of the network using wired connection or information indicative of the network using wireless connection,
the printer information acquiring section determines that the network information of the second network is identical to the network information of the first network in a case where both of the network information of the second network and the network information of the first network is the information indicative of the network using wired connection or in a case where both of the network information of the second network and the network information of the first network is the information indicative of the network using wireless connection, whereas the printer information acquiring section determines that the network information of the second network is different from the network information of the first network in a case where one of the network information of the second network and the network information of the first network is the information indicative of the network using wired connection and the other one of the network information of the second network and the network information of the first network is the information indicative of the network using wireless connection.

5. A printer control apparatus which controls plural kinds of printers by use of a universal printer driver which is capable of communicating with the plural kinds of printers via a network and which supports the plural kinds of printers,
the printer control apparatus comprising:
network information storage means;
a network information acquiring section that acquires network information for determining whether or not a second network connected to the printer control apparatus this time is identical to a first network connected to the printer control apparatus previous time and that causes the network information thus acquired to be stored in the network information storage means;

printer information storage means;

a printer search section that conducts a search for printers connected to the network, acquires printer information indicative of the printers thus extracted by the search, and causes the printer information thus acquired to be associated with the network information and to be stored, as history information, in the printer information storage means;

a printer information acquiring section that compares network information of the second network and network information of the first network, and in a case where the network information of the second network is different from the network information of the first network and where the history information stored in the printer information storage means does not include the printer information of the second network, the printer information acquiring section acquiring the printer information from the printer search section by causing the printer search section to conduct the search, whereas in a case where the network information of the second network is different from the network information of the first network and where the history information stored in the printer information storage means includes the printer information of the second network or in a case where the network information of the second network is identical to the network information of the first network, the printer information acquiring section acquiring the printer information corresponding to the network information of the second network from the printer information storage means without causing the printer search section to conduct the search and a printer list creating section that (i) creates a printer list that shows, as a list of printers connected to the network to which the printer control apparatus is currently connected, the printer information acquired by the printer information acquiring section and (ii) causes printer information of a selected printer which is a printer selected from the printer list by a user to be associated with the network information of the network to which the printer control apparatus is currently connected and to be stored in the printer information storage means, the printer information containing at least information indicative of model names of the respective printers corresponding to the printer information, in a case where (i) the printer information acquiring section determines that the network information of the second network is different from the network information of the first network and (ii) printer information, which is acquired by the printer information acquiring section, of printer connected to the second network contains printer information of a printer whose model name is identical to that of the selected printer which has been selected by the user while the selected printer is being connected to the first network, the printer list creating section causing the printer information of the printer, whose model name is identical to that of the selected printer, to be listed high on the printer list.

6. The printer control apparatus according to claim 5, further comprising a user interface creating section that creates, based on the printer information acquired by the printer information acquiring section, a user interface for accepting a user's designation as to conditions for a printer to be selected.

7. The printer control apparatus according to claim 5, wherein the network information is at least one of an IP address of the printer control apparatus in the network to which the printer control apparatus is connected, a Subnet Mask of the printer control apparatus, a Default Gateway of the printer control apparatus, a DNS address of the printer control apparatus, and a WINS address of the printer control apparatus.

8. The printer control apparatus according to claim 5, wherein:

each of the first network and the second network is a network using wireless connection or a network using wired connection, the network information is information indicative of the network using wired connection or information indicative of the network using wireless connection, the printer information acquiring section determines that the network information of the second network is identical to the network information of the first network in a case where both of the network information of the second network and the network information of the first network is the information indicative of the network using wired connection or in a case where both of the network information of the second network and the network information of the first network is the information indicative of the network using wireless connection, whereas the printer information acquiring section determines that the network information of the second network is different from the network information of the first network in a case where one of the network information of the second network and the network information of the first network is the information indicative of the network using wired connection and the other one of the network information of the second network and the network information of the first network is the information indicative of the network using wireless connection.

9. A printer control method for controlling plural kinds of printers by use of a universal printer driver which is capable of communicating with the plural kinds of printers via a network and which supports the plural kinds of printers, the printer control method comprising the steps of:

(a) conducting a search for printers connected to the network, acquiring printer information indicative of the printers thus extracted by the search, and causing the printer information thus acquired to be stored in printer information storage means;

(b) acquiring network information for determining whether or not a second network used this time is identical to a first network used previous time and that causes the network information thus acquired to be stored in network information storage means;

(c) comparing network information of the second network and network information of the first network, and in a case where the network information of the second network is different from the network information of the first network, acquiring the printer information by carrying out the step (a), whereas in a case where the network information of the second network is identical to the network information of the first network, acquiring the printer information stored in the printer information storage means without carrying out the step (a);

(d) creating a printer list that shows, as a list of printers connected to the network to which the printer control apparatus is currently connected, the printer information acquired by the printer information acquiring section; and (e) causing printer information of a selected printer which is a printer selected from the printer list by a user to be associated with the network information of the network to which the printer control apparatus is currently connected and to be stored in the printer information storage means, wherein the printer information contains at least information indicative of model names of the respective printers corresponding to the printer information, and in a case wherein (i) it is determined that the network information of the second network is different from the network information of the first network and (ii) printer information, which is acquired by the printer information acquiring section, of printer connected to the second network contains printer information of a printer whose model name is identical to that of the selected printer which has been selected by the user while the selected printer is being connected to the first network, the printer list creating section causes the printer information of the printer, whose model name is identical to that of the selected printer, to be listed high on the printer list.

10. A printing system which includes a printer control apparatus, plural kinds of printers connected to the printer control apparatus via a network, and a network information managing apparatus that provides network information, the printer control apparatus controlling the plural kinds of printers by use of a universal printer driver which is capable of communicating with the plural kinds of printers via the network and which supports the plural kinds of printers the printing system comprising:

printer information storage means;

a printer search section that conducts a search for printers connected to the network, acquires printer information indicative of the printers thus extracted by the search, and causes the printer information thus acquired to be stored in the printer information storage means;

network information storage means;

a network information acquiring section that acquires network information for determining whether or not a second network connected to the printer control apparatus this time is identical to a first network connected to the printer control apparatus previous time and that causes the network information thus acquired to be stored in the network information storage means;

a printer information acquiring section that compares network information of the second network and network information of the first network, and in a case where the network information of the second network is different from the network information of the first network, the printer information acquiring section acquiring the printer information from the printer search section by causing the printer search section to conduct the search, whereas in a case where the network information of the second network is identical to the network information of the first network, the printer information acquiring section acquiring the printer information from the printer information storage means without causing the printer search section to conduct the search; and a printer list creating section that (i) creates a printer list that shows, as a list of printers connected to the network to which the printer control apparatus is currently connected, the printer information acquired by the printer information acquiring section and (ii) causes printer information of a selected printer which is a printer selected from the printer list by a user to be associated with the network information of the network to which the printer control apparatus is currently connected and to be stored in the printer information storage means, the printer information containing at least information indicative of model names of the respective printers corresponding to the printer information, in a case where (i) the printer information acquiring section determines that the network information of the second network is different from the network information of the first network and (ii) printer information, which is acquired by the printer information acquiring section, of printer connected to the second network contains printer information of a printer whose model name is identical to that of the selected printer which has been selected by the user while the selected printer is being connected to the first network, the printer list creating section causing the printer information of the printer, whose model name is identical to that of the selected printer, to be listed high on the printer list.

11. A non-transitory computer-readable storage medium in which a program for causing a computer to function as each section of a printer control apparatus which controls plural kinds of printers by use of a universal printer driver which is capable of communicating with the plural kinds of printers via a network and which supports the plural kinds of printers, the printer control apparatus including:

printer information storage means;

a printer search section that conducts a search for printers connected to the network, acquires printer information indicative of the printers thus extracted by the search, and causes the printer information thus acquired to be stored in the printer information storage means;

network information storage means;

a network information acquiring section that acquires network information for determining whether or not a second network connected to the printer control apparatus this time is identical to a first network connected to the printer control apparatus previous time and that causes the network information thus acquired to be stored in the network information storage means;

a printer information acquiring section that compares network information of the second network and network information of the first network, and in a case where the network information of the second network is different from the network information of the first network, the printer information acquiring section acquiring the printer information from the printer search section by causing the printer search section to conduct the search, whereas in a case where the network information of the second network is identical to the network information of the first network, the printer information acquiring section acquiring the printer information from the printer information storage means without causing the printer search section to conduct the search; and a printer list creating section that (i) creates a printer list that shows, as a list of printers connected to the network to which the printer control apparatus is currently connected, the printer information acquired by the printer information acquiring section and (ii) causes printer information of a selected printer which is a printer selected from the printer list by a user to be associated with the network information of the network to which the printer control apparatus is currently connected and to be stored in the printer information storage means, the printer information containing at least information indicative of model names of the respective printers corresponding to the printer information, in a case where (i) the printer information acquiring section determines that the network information of the second network is different from the network information of the first network and (ii) printer information, which is acquired by the printer information acquiring section, of printer connected to the second network contains printer information of a printer whose model name is identical to that of the selected printer which has been selected by the user while the selected printer is being connected to the first network, the printer list creating section causing the printer information of the printer, whose model name is identical to that of the selected printer, to be listed high on the printer list.

\* \* \* \* \*